(12) United States Patent
Choi

(10) Patent No.: US 12,695,950 B2
(45) Date of Patent: Jul. 28, 2026

(54) DISPLAY DEVICE AND METHOD FOR RECOMMENDING CONTENT USING SAME

(71) Applicant: LG ELECTRONICS INC., Seoul (KR)

(72) Inventor: Yookyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 18/560,654

(22) PCT Filed: Apr. 8, 2022

(86) PCT No.: PCT/KR2022/005105
§ 371 (c)(1),
(2) Date: Jul. 3, 2024

(87) PCT Pub. No.: WO2022/260259
PCT Pub. Date: Dec. 15, 2022

(65) Prior Publication Data
US 2024/0406506 A1 Dec. 5, 2024

(30) Foreign Application Priority Data
Jun. 11, 2021 (KR) ........................ 10-2021-0076262

(51) Int. Cl.
*H04N 21/466* (2011.01)
*G06F 3/14* (2006.01)
(Continued)

(52) U.S. Cl.
CPC ....... *H04N 21/4668* (2013.01); *G06F 3/1454* (2013.01); *H04N 21/44231* (2013.01); *H04N 21/4826* (2013.01)

(58) Field of Classification Search
CPC ......... H04N 21/4668; H04N 21/44231; H04N 21/4826; H04N 21/4122; H04N 21/436;
(Continued)

(56) References Cited

U.S. PATENT DOCUMENTS

2009/0046204 A1 2/2009 Kim et al.
2009/0096964 A1 4/2009 Park et al.
(Continued)

FOREIGN PATENT DOCUMENTS

KR 1020090036467 4/2009
KR 10-2010-0087561 8/2010
(Continued)

OTHER PUBLICATIONS

PCT International Application No. PCT/KR2022/005105, International Search Report dated Jul. 14, 2022, 2 pages.
(Continued)

*Primary Examiner* — Cynthia M Fogg
(74) *Attorney, Agent, or Firm* — LEE, HONG, DEGERMAN, KANG & WAIMEY

(57) ABSTRACT

A display device comprises a display configured to display first content, a processor configured to perform a mirroring operation of displaying the first content on an external device and a communication interface configured to receive device identification information of the external device from the external device. The processor generates first content playback information of the first content and transmits the device identification information of the external device and the first content playback information to a content server through the communication interface.

12 Claims, 9 Drawing Sheets

(51) Int. Cl.
  *H04N 21/442* (2011.01)
  *H04N 21/482* (2011.01)

(58) Field of Classification Search
  CPC ........... H04N 21/4852; H04N 21/4854; H04N
              21/47202; H04N 21/42684; H04N
              21/25825; H04N 21/41265; H04N
              21/25891; H04N 21/4662; H04N
              21/4532; H04N 21/4755; G06F 3/1454
  USPC .......................................................... 725/14
  See application file for complete search history.

(56) References Cited

U.S. PATENT DOCUMENTS

| | | | |
|---|---|---|---|
| 2010/0191755 A1 | 7/2010 | Kim et al. | |
| 2013/0328878 A1* | 12/2013 | Stahl ..................... | G06F 3/1454 |
| | | | 345/1.3 |
| 2014/0215525 A1 | 7/2014 | Jeong et al. | |
| 2014/0373123 A1 | 12/2014 | Kang | |
| 2016/0227291 A1* | 8/2016 | Shaw ................. | H04N 21/4826 |
| 2016/0357773 A1 | 12/2016 | DeLuca | |
| 2017/0131963 A1 | 5/2017 | Stahl et al. | |
| 2018/0103079 A1* | 4/2018 | Lewis ................... | H04L 67/131 |
| 2020/0059693 A1* | 2/2020 | Neumeier ........ | H04N 21/44016 |
| 2020/0272678 A1 | 8/2020 | Lee et al. | |
| 2021/0021660 A1* | 1/2021 | Lewis ................... | H04L 65/764 |
| 2021/0168439 A1* | 6/2021 | Jin ................... | H04N 21/41407 |
| 2021/0250395 A1* | 8/2021 | VanBlon ................ | H04L 65/60 |
| 2022/0035594 A1* | 2/2022 | Kim ..................... | H04R 1/1041 |
| 2022/0210559 A1* | 6/2022 | Ryu ........................ | H04R 5/04 |
| 2022/0350564 A1* | 11/2022 | Cao ........................ | G06F 3/1454 |
| 2022/0414241 A1* | 12/2022 | Chittampally .......... | G06F 21/84 |
| 2023/0009446 A1* | 1/2023 | Mun ...................... | H04L 65/65 |

FOREIGN PATENT DOCUMENTS

| | | | | |
|---|---|---|---|---|
| KR | 1020120076523 | 7/2012 | | |
| KR | 1020130039642 | 4/2013 | | |
| KR | 1020140095854 | 8/2014 | | |
| KR | 1020140126955 | 11/2014 | | |
| KR | 1020140146954 | 12/2014 | | |
| KR | 1020150068686 | 6/2015 | | |
| KR | 10-2020-0104719 | 9/2020 | | |
| KR | 20220014213 A | * 2/2022 | ............. | G06F 3/165 |

OTHER PUBLICATIONS

Korean Intellectual Property Office Application No. 10-2021-0076262, Office Action dated Jan. 5, 2026, 5 pages.

* cited by examiner

300

<u>10</u>

1

DISPLAY DEVICE AND METHOD FOR RECOMMENDING CONTENT USING SAME

CROSS-REFERENCE TO RELATED APPLICATION(S)

This application is the National Stage filing under 35 U.S.C. 371 of International Application No. PCT/KR2022/005105, filed on Apr. 8, 2022, which claims the benefit of earlier filing date and right of priority to Korean Application No. 10-2021-0076262, filed on Jun. 11, 2021, the contents of which are all incorporated by reference herein in their entirety.

TECHNICAL FIELD

The present disclosure relates to a display device and, more particularly, to a display device for providing a content recommendation service based on an external device when the display device performs mirroring to an external device.

BACKGROUND ART

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

In this way, a lot of diverse content has been produced and supplied recently. Therefore, the importance of a content recommendation service that can recommend content by identifying information about what types of content is being played on the display device the user is watching and identifying preferred content on the display device the user is watching is emerging.

In addition, as display devices become more popular, more and more households have multiple display devices. The type of preferred content for each display device may vary depending on the location, user, etc., and the importance of a service that can recommend content by identifying preferred content for each display device is increasing.

Meanwhile, the number of cases of watching content using mirroring services when there are multiple display devices is increasing. However, when mirroring content played from a first display device that plays content to a second display device, since information related to content playback is generated in the first display device, it is difficult to identify the preferred content in the second display device.

INVENTION

Technical Problem

An object of the present disclosure is to provide a content recommendation system for providing a content recommendation service for an external device, by transmitting and storing content playback information to and in a content server in association with device identification information of the external device when a display device mirrors content to the external device.

An object of the present disclosure is to provide a content recommendation system that allows an image quality, volume and preferred channel to be automatically set in an external device based on content setting information when content is mirrored to the external device in the future, by transmitting, to a content server, the content setting information such as image quality information, volume information and preferred channel information set during mirroring in association with device identification information of the external device when a display device mirrors content to the external device.

Technical Solution

A display device according to an embodiment of the present disclosure comprises a display configured to display first content, a processor configured to perform a mirroring operation of displaying the first content on an external device and a communication interface configured to receive device identification information of the external device from the external device. The processor generates first content playback information of the first content and transmits the device identification information of the external device and the first content playback information to a content server through the communication interface.

The display device according to the embodiment of the present disclosure includes the processor for generating first content setting information of the first content and transmitting the device identification information of the external device and the first content playback information to the content server through the communication interface.

The display device according to the embodiment of the present disclosure includes the processor for obtaining a content change command for changing the first content to second content, changing the first content to the second content in response to the content change command and performing a mirroring operation of displaying the second content on the external device The display device according to the embodiment of the present disclosure includes the processor for generating second content playback information or second content setting information of the second content and transmitting at least one of the device identification information of the external device, the second content playback information or the second content setting information to the content server.

The display device according to the embodiment of the present disclosure includes the processor for obtaining the content change command from the external device through the communication interface The display device according to the embodiment of the present disclosure includes the processor for transmitting the device identification information of the external device and a content recommendation request to the content server through the communication interface.

The display device according to the embodiment of the present disclosure includes the processor for receiving a recommendation content list recommended based on the device identification information of the external device from the content server through the communication interface and displaying the recommendation content list to mirror the list to the external device.

The display device according to the embodiment of the present disclosure includes the processor for receiving content setting information provided based on the device identification information of the external device from the content server through the communication interface and setting image quality of the first content based on image quality setting information included in the content setting information to mirror the first content to the external device.

The display device according to the embodiment of the present disclosure includes the processor for setting a volume of the first content based on volume setting information included in the content setting information to mirror the first content to the external device.

A content recommendation method according to an embodiment of the present disclosure comprises displaying first content, performing a mirroring operation of displaying the first content on an external device, receiving device identification information of the external device from the external device, generating first content playback information of the first content, and transmitting the device identification information of the external device and the first content playback information to a content server.

Effect of the Invention

According to an embodiment of the present disclosure, a content recommendation system may provide a content recommendation service for an external device, by transmitting and storing content playback information to and in a content server in association with device identification information of the external device when a display device mirrors content to the external device.

According to an embodiment of the present disclosure, the content recommendation system can determine preferred content from the external device even when the display device mirrors content to the external device.

According to an embodiment of the present disclosure, when the display device mirrors content to the external device, the preferred content settings in the external device can be identified based on content setting information received from the content server, and the image quality and volume of the mirrored content can be automatically set or the preferred channel of the external device may be automatically set.

4

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
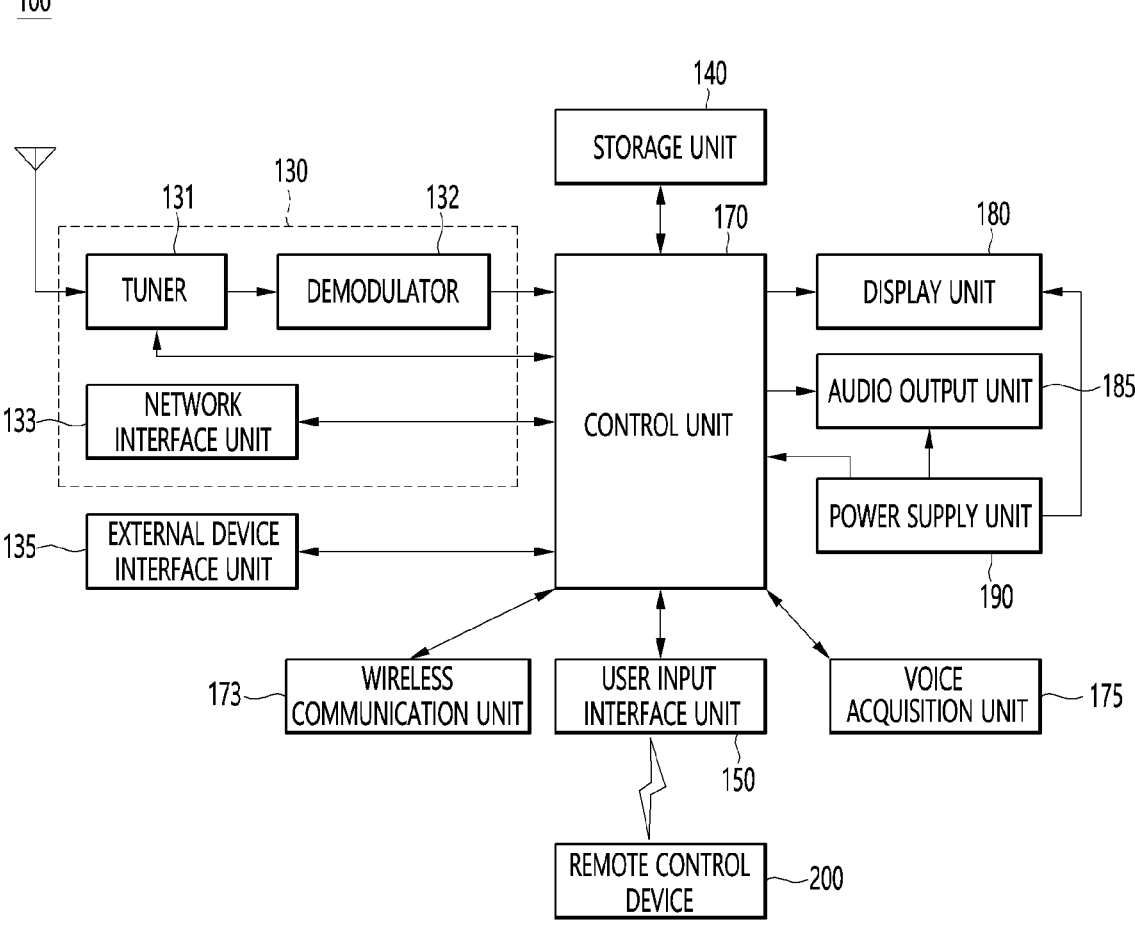
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
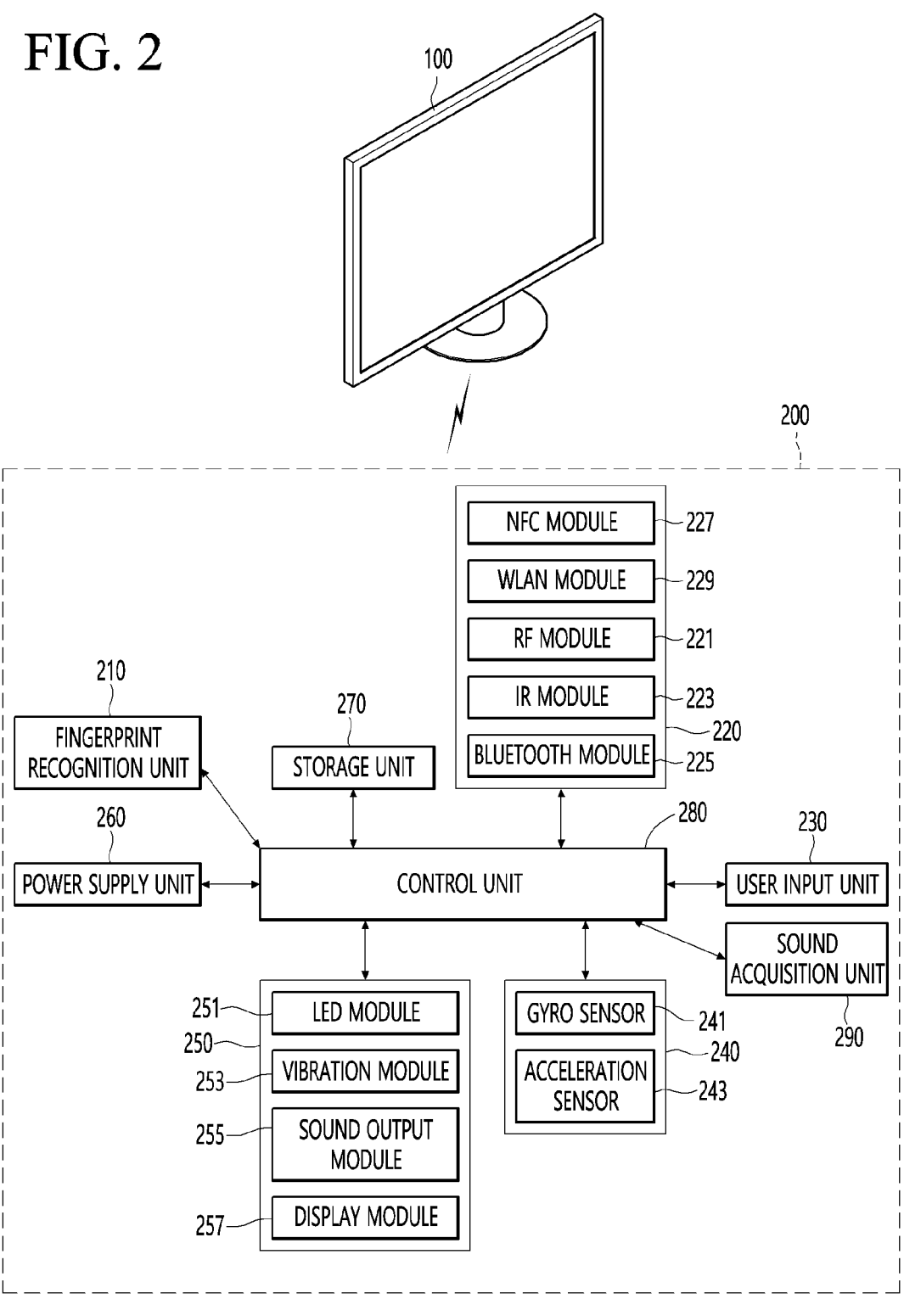
FIG. 2 is a block diagram illustrating a remote control device according to an embodiment of the present disclosure
Figure 3:
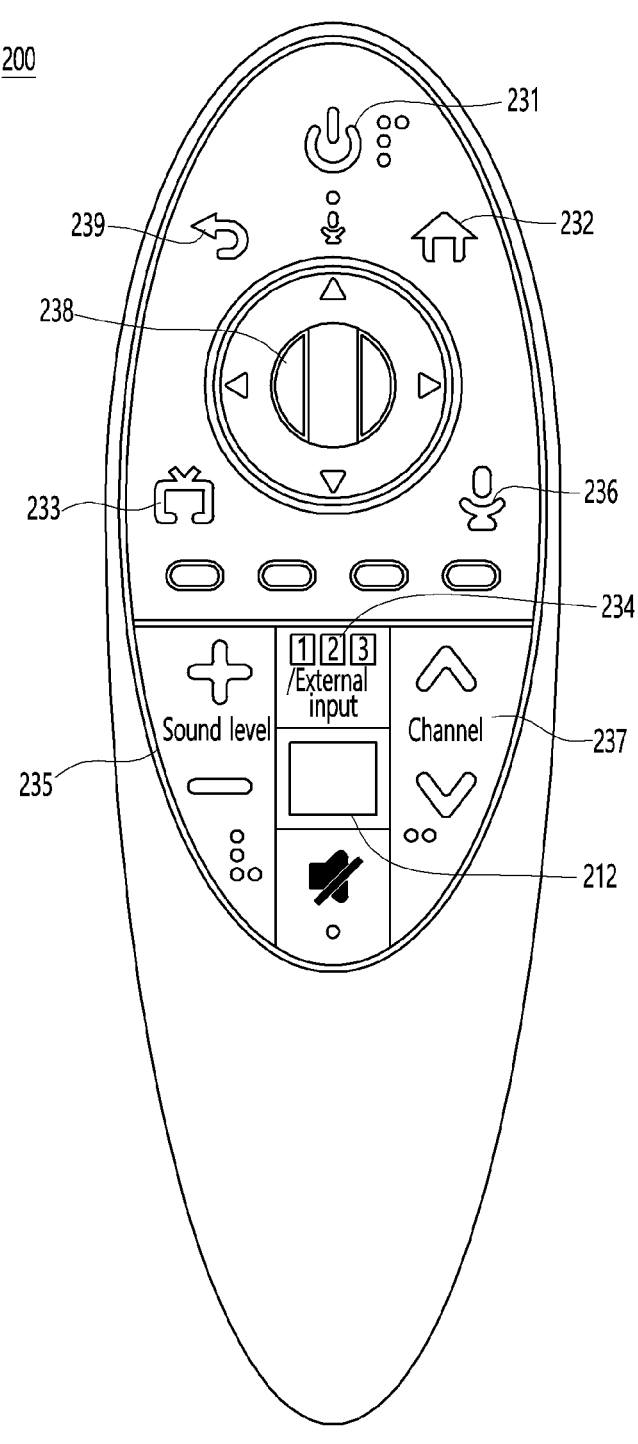
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
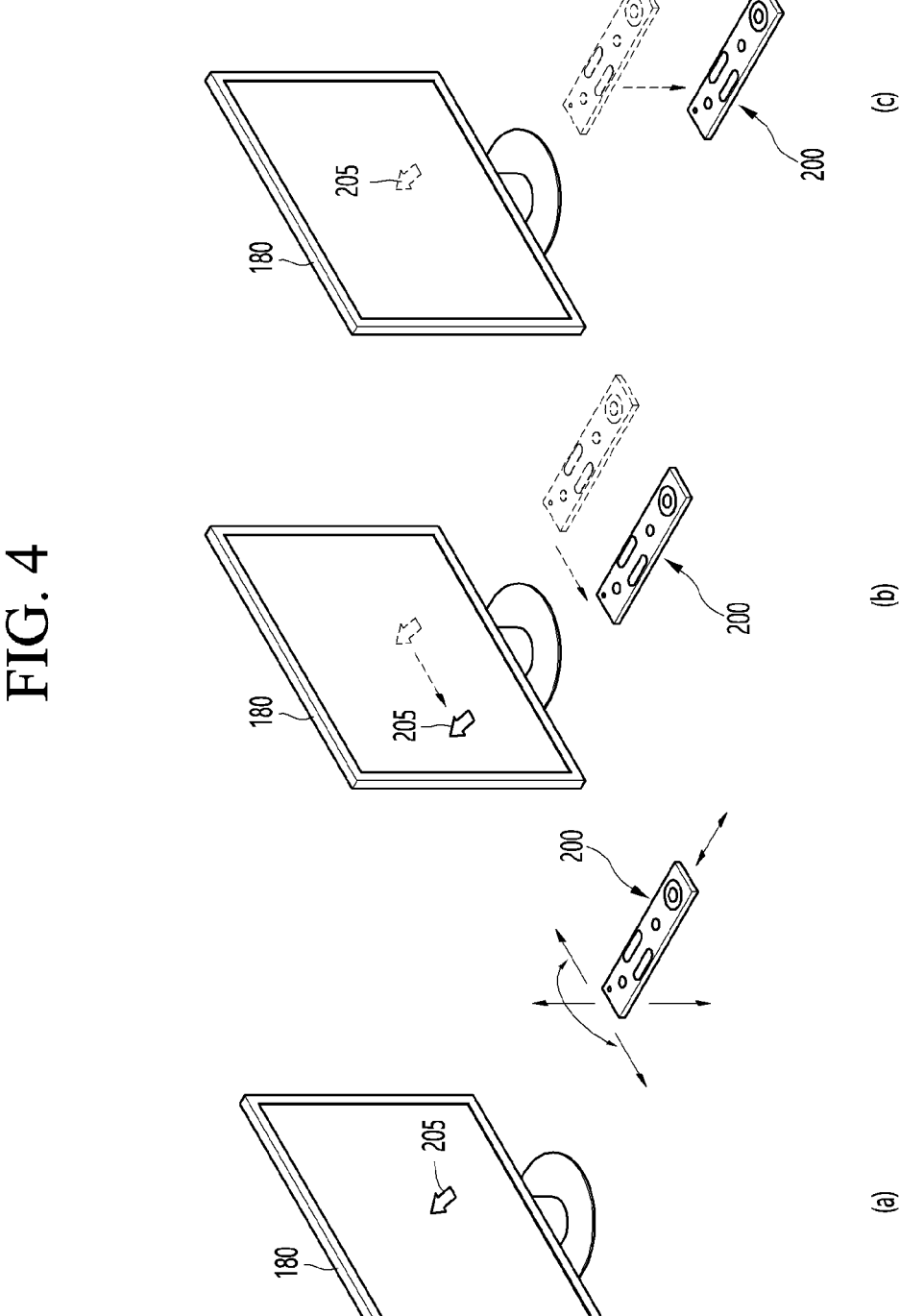
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Meanwhile, the control unit 170 may be referred to as a processor 170. The wireless communication unit 173 may be referred to as a communication interface 173. Also, the storage unit 140 may be referred to as a memory 140.

Figure 5:
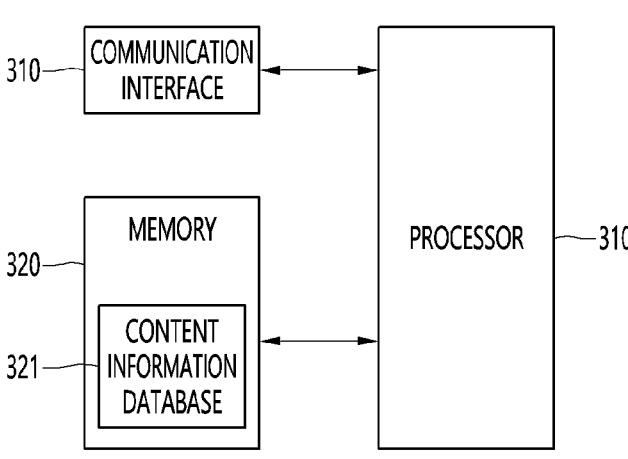
FIG. 5 is a diagram illustrating a content server according to an embodiment of the present disclosure.

FIG. 5 is a diagram illustrating a content server according to an embodiment of the present disclosure.

The content server 300 may provide a recommendation service that recommends content that a viewer using a display device 100 may prefer.

The content server 300 may include a communication interface 310, a memory 320 and a processor 330.

The content server 300 may transmit and receive data to and from at least one display device 100 through the communication interface 310 through wired/wireless communication.

The memory 320 may include a content information database 321. The content information database 321 may store information related to content played on each device. For example, the content information database 321 may store content playback information, content setting information or application installation information in association with identification information of each device.

When receiving a content recommendation request from the display device 100 or an external device, the processor 330 may recommend content optimized for each device based on data stored in the content information database 321.

Figure 6:
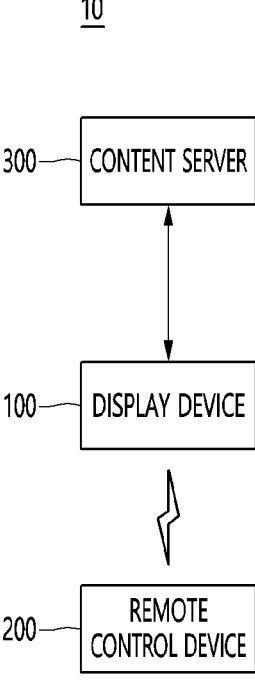
FIG. 6 is a diagram illustrating a content recommendation system according to an embodiment of the present disclosure.

FIG. 6 is a diagram illustrating a content recommendation system according to an embodiment of the present disclosure.

The content recommendation system 10 may include at least one display device 100, at least one remote control device 200 and a content server 300.

The processor 170 of the display device 100 may play content.

In addition, the processor 170 may generate content playback information of the played content. In addition, the processor 170 may generate content setting information, which is information about image quality, volume, and preferred channels set when playing the content.

The content playback information may include at least one of content identification information of the played content, content genre information, content playback start time information, content playback end time information or total content playback time information.

The content setting information may include at least one of image quality information set with respect to the content when playing content, volume information, or preferred channel information regarding whether a user has registered a channel providing the content as a preferred channel.

The processor 170 may transmit device identification information of the display device 100, the generated content playback information, and the generated content setting information to the content server 300 through the communication interface 173. The device identification information may be unique identification information to distinguish a device from other devices.

The content server 300 may store the content playback information and content setting information received from the display device 100 in the content information database 321 in association with the device identification information.

Meanwhile, the processor 170 may receive a content recommendation command through the user input interface unit 150 or the voice acquisition unit 175.

When receiving the content recommendation command, the processor 170 may transmit the device identification information of the display device 100 and a content recommendation request to the content server 300 through the communication interface 173.

The communication interface 310 of the content server 300 may receive the device identification information and the content recommendation request from the display device 100.

The processor 330 of the content server 300 may obtain the content playback information and content setting information associated with the display device 100 from the content information database 321 based on the device identification information.

The processor 330 may generate content recommendation information and recommendation setting information for the display device 100 based on the content playback information and content setting information. The content recommendation information may include recommendation content identification information and recommendation content genre information of at least one recommendation content. In addition, the recommendation setting information may include recommendation image quality setting information and preferred channel information.

The processor 330 may transmit the content recommendation information and recommendation setting information to the display device 100 through the communication interface 310.

The processor 170 may receive the content recommendation information and recommendation setting information from the content server 300 through the communication interface 173.

The processor 170 may display at least one recommendation content based on the received content recommendation information. In addition, when a playback command for recommendation content is input through the user input interface unit 150 or the voice acquisition unit 175, the processor 170 may set the image quality for the recommendation content to be played based on the received recommendation setting information and perform playback.

The recommendation content may be played by setting the image quality thereof, and when a change to a preferred channel is input from the user, the channel may be changed to the preferred channel based on the preferred channel information.

Meanwhile, the display device 100 may mirror the content being played to an external device. The external device may include another display device or a mobile device. In this case, the mirrored content may be viewed through the external device. Therefore, there is a need for viewing information of mirrored content to become basic data for recommending content to the external device.

Meanwhile, when the display device 100 performs a mirroring operation with an external device, a control command for controlling the display device 100 may be received from the external device. The control command may include a content change command that changes the content being played from the first content to the second content. When receiving a content change command, the display device 100 may play the changed content. In this case, there is a need for the display device 100 to transmit content playback information of the changed content to the content server 300 as information for content recommendation of an external device.

Figure 7:
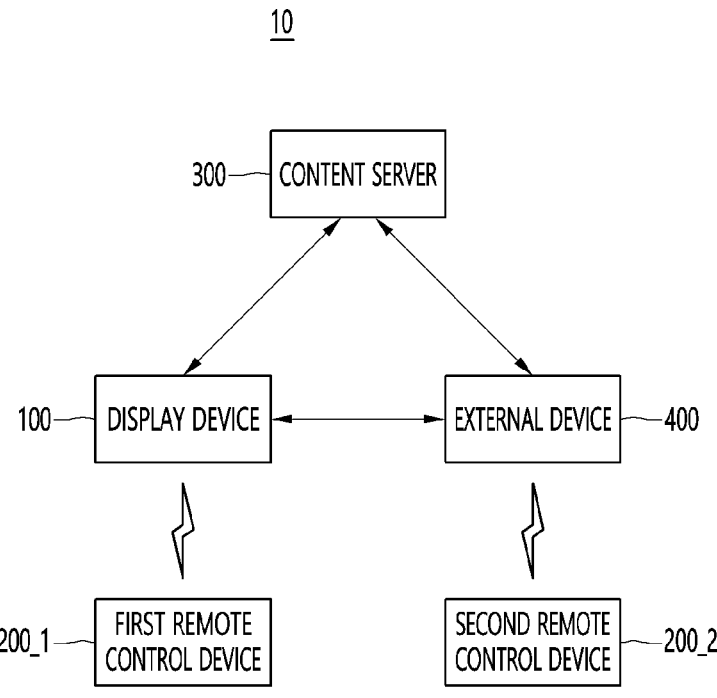
FIG. 7 is a diagram illustrating a content recommendation system according to an embodiment of the present disclosure.

FIG. 7 is a diagram illustrating a content recommendation system according to an embodiment of the present disclosure.

The content recommendation system 10 may include a content server 300 that may store information about the content viewed by a user in conjunction with each of a plurality of display devices 100_1 and 100_2 and recommend content preferred in each of the display devices 100_1 and 100_2 among the plurality of content.

Meanwhile, the first content may be played on the first display device 100_1. In addition, the first content played on the first display device 100_1 may be mirrored to the second display device 100_2. The second display device 100_2 may display the mirrored first content through the display unit.

Meanwhile, in the conventional content recommendation system, when the first display device 100_1 is mirroring content to the second display device 100_2, the first content is being played on the first display device 100_1 and thus the content playback information and content setting information of the first content may be stored in the content server 300 in association with the device identification information of the first display device 100_1. However, since the first content is being mirrored and viewed by the user on the second display device 100_2, the content playback information and content setting information of the first content needs to be stored in the content server 300 in association with the device identification information of the second display device 100_2.

Accordingly, when mirroring the first content to the external device 400, the first display device 100_1 may obtain device identification information of the external device 400 from the external device 400.

Figure 8:
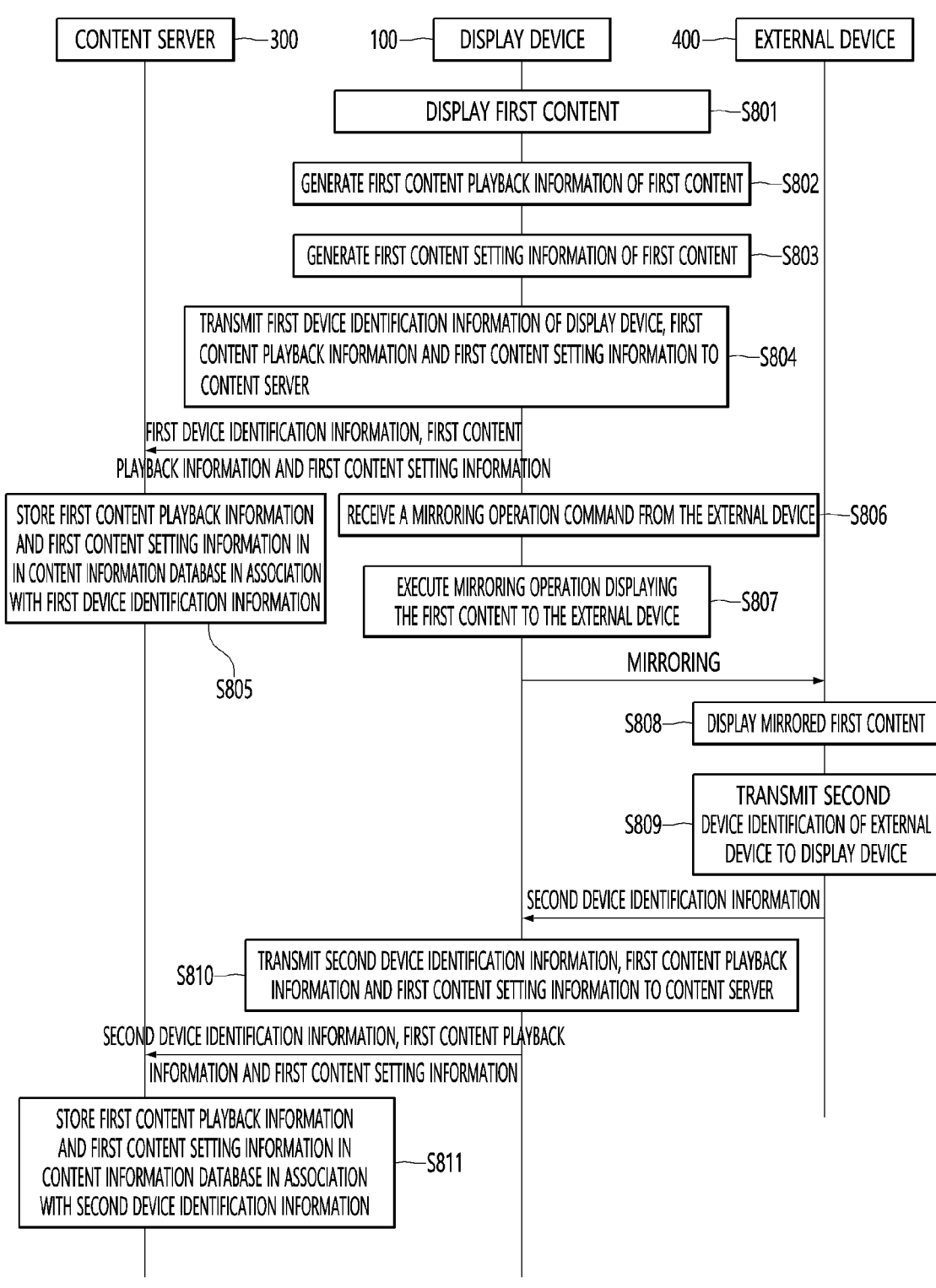
FIG. 8 is a flowchart illustrating a process of operating a content recommendation system according to an embodiment of the present disclosure.

FIG. 8 is a flowchart illustrating a process of operating a content recommendation system according to an embodiment of the present disclosure.

The display device 100 may display first content (S801). The processor 170 of the display device 100 may display the first content through the display unit 180. The first content may include content of various genres provided through various channels.

The processor 170 of the display device 100 may generate first content information of the first content. The first content information may include at least one of first content playback information or first content setting information. The first content playback information may include at least one of content identification information, content genre information, content playback start time information, content playback end time information or total content playback time information of the first content being played. When the first content is played, the first content setting information may include at least one of image quality information set with respect to the first content, volume information, or preferred channel information regarding whether the user has registered a channel providing the content as a preferred channel.

Meanwhile, the processor 170 of the display device 100 may generate first content playback information of the first content (S802). The display device 100 may generate and store the first content playback information of the first content from the start of playback of the first content until the playback ends.

In addition, the processor 170 of the display device 100 may generate first content setting information of the first content (S803). The display device 100 may generate and store image quality information, volume information, and preferred channel information that are set when the first content is played.

Meanwhile, the processor 170 of the display device 100 may transmit the first device identification information, first content playback information, and first content setting information of the display device 100 to the content server 300 through the communication interface 173 (S804). The first device identification information may be unique identification information of the display device 100 that allows the display device 100 to be distinguished from other devices.

Meanwhile, the communication interface 310 of the content server 300 may receive first device identification information, first content playback information and first content setting information from the display device 100.

In addition, the processor 330 of the content server 300 may store the first content playback information and the first content setting information in the content information database 321 in association with the first device identification information.

Meanwhile, the display device 100 may receive a mirroring operation command from the external device 400 (S806). The mirroring operation may refer to an operation of capturing a screen displayed on the display device 100 at a predetermined period and transmitting the captured image to a mirroring target device.

Meanwhile, the external device 400 may display the mirrored first content (S808).

The external device 400 may include not only the display device but also various electronic devices such as smartphones or tablets.

In addition, the external device 400 may transmit the second device identification information of the external device 400 to the display device 100 (S809). The second device identification information may be unique identification information that allows the external device 400 to be distinguished from other devices.

Meanwhile, when the external device 400 is a device capable of operating with multiple applications installed, application installation information including the application ID of each of the multiple applications installed in the external device 400 may be transmitted to the display device 100.

Meanwhile, the communication interface 173 of the display device 100 may receive second device identification information. The processor 170 of the display device 100 may transmit the received second device identification information, first content generation information, and first content setting information to the content server 300.

In this case, the processor 170 may generate or change first content setting information based on a time when mirroring of the first content to the external device 400 started, a time when mirroring ended, and a total mirroring time.

For example, the processor 170 may generate the time when mirroring of the first content to the external device 400 started as content playback start time information of the first content setting information. The processor 170 may generate the time when mirroring of the first content to the external device 400 ended as content playback end time information of the first content setting information. The processor 170 may generate the total time for which the first content was mirrored to the external device 400 as total content playback time information of the first content setting information. Accordingly, the processor 170 may generate information about how much the mirrored first content was preferred in the external device 400, so that it can be used as basic data to recommend content for the external device 400 in the future.

In addition, the processor 170 may generate or change first content setting information based on image quality information and volume information set when the first content is mirrored to the external device 400.

For example, the display resolutions of the display device 100 and the external device 400 may be different, and the volume of the speaker of the display device 400 and the speaker sound of the external device 400 may be different.

In this case, the user may change the image quality or volume of the first content mirrored through the display device 100, the external device 400, the first remote control device 200_1, or the second remote control device 200_2. In addition, the display device 100 may perform a mirroring operation on the first content based on the changed image quality information and volume information. Therefore, the first content setting information will be basic data that allows mirroring by automatically setting the image quality information and volume information for the external device 400 when the first content is mirrored to the external device 400 in the future.

Meanwhile, when the display device 100 receives the application installation information from the external device 400, the application installation information may be transmitted to the content server 300. Accordingly, the content server 300 may store the received application installation information in association with the second device identification information, and generate a recommendation application list based on the application installation information stored in association with the device identification information of the external device 400 even when mirrored from the display device 100 to the external device 400. The recommendation application list may be transmitted to the display device 100, and the display device 100 may mirror the recommendation application to the external device 400.

Meanwhile, the display device 100 may transmit the second device identification information, the first content playback information, and the first content setting information to the content server 300 (S810).

The processor 170 of the display device 100 may transmit the received second device identification information, first content playback information, and first content setting information to the content server 300 through the communication interface 173.

Meanwhile, the content server 300 may store the first content playback information and the first content setting information in the content information database 321 in association with the second device identification information (S811).

Figure 9:
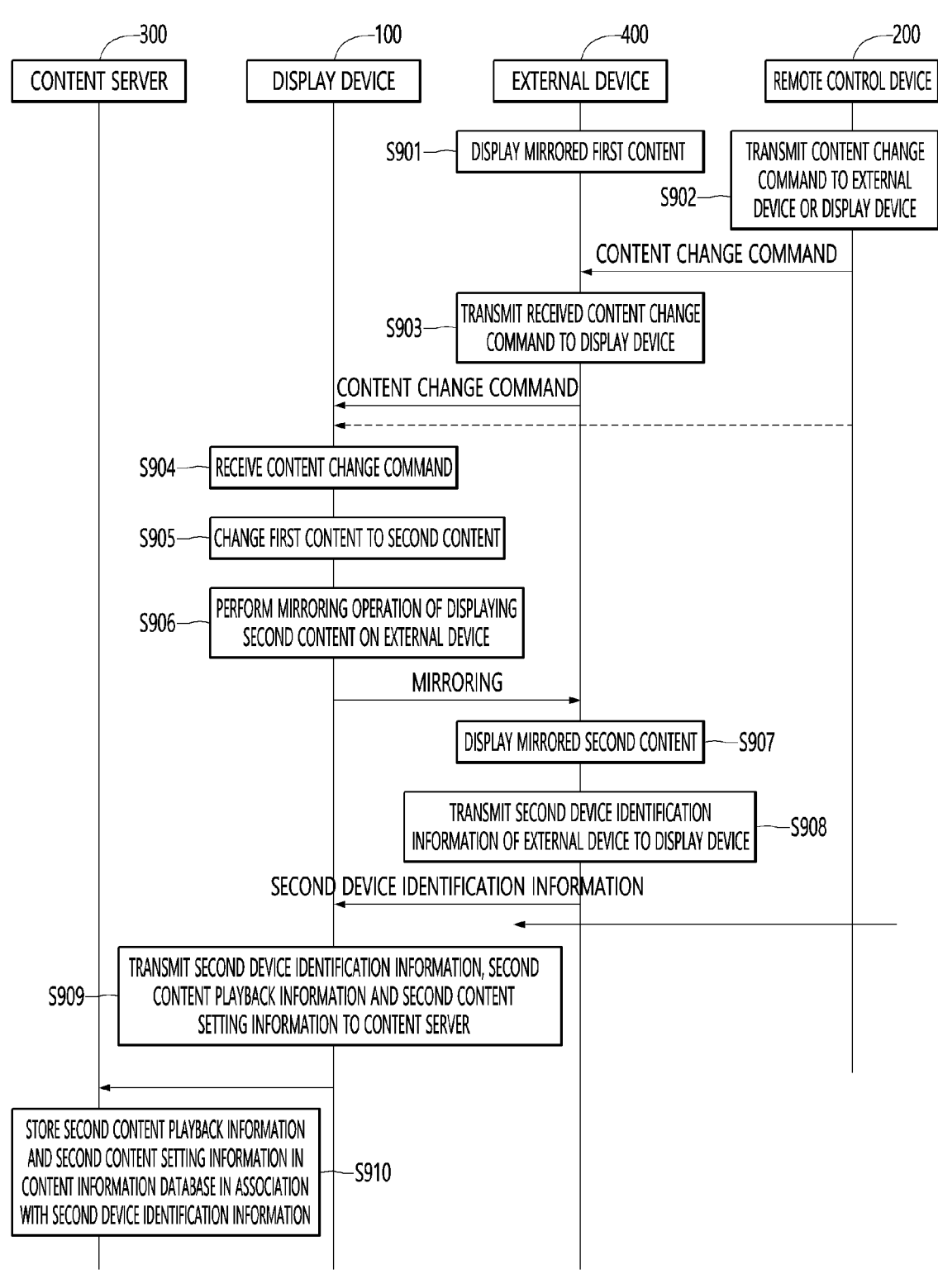
FIG. 9 is a flowchart illustrating a process of operating a content recommendation system according to an embodiment of the present disclosure.

Meanwhile, FIG. 9 is a flowchart illustrating a process of operating a content recommendation system according to an embodiment of the present disclosure.

The external device 400 may display mirrored first content (S901).

Meanwhile, while the external device 400 displays the mirrored first content, the user may input a content change command to change the first content to second content using the remote control device 200. The remote control device 200 may include a first remote control device 200_1 that remotely controls the display device 100 or a second remote control device 200_2 that remotely controls the external device 400.

When receiving the content change command, the remote control device 200 may transmit the content change command to the external device 400 or the display device 100 (S902).

When the remote control device 200 transmits the content change command to the external device 400, the external device 400 may transmit the received content change command to the display device 100 (S903). For example, when the external device 400 is linked to the display device 100 through a UIBC (User Input Back Channel), the external device 400 may transmit the received content change command to the display device 100 through the UIBC.

Meanwhile, the display device 100 may receive the content change command from the remote control device 200 or the external device 400 (S904). For example, the user input interface unit 150 of the display device 100 may directly receive the content change command from the remote control device 200. In addition, the content change command may be received from the external device 400 through the communication interface 173 of the display device 100.

Meanwhile, the processor 170 of the display device 100 may change the first content to the second content in response to the received content change command (S905). In addition, the processor 170 may display the changed second content on the display unit 180.

In addition, the processor 170 of the display device 100 may perform a mirroring operation of displaying the second content on the external device 400 (S906). The external device 400 may display the mirrored second content (S907). In addition, the external device 400 may transmit the second device identification information of the external device 400 to the display device 100 (S908).

In addition, the processor 170 of the display device 100 may transmit second device identification information, second content playback information, and second content setting information to the content server (S909).

Meanwhile, the content server 300 may store the second content playback information and the second content setting information in the content information database 321 in association with the second device identification information (S910).

Meanwhile, FIG. 10 is a flowchart illustrating a process of operating a content recommendation system according to an embodiment of the present disclosure.

During the mirroring operation, the display device 100 may receive a content recommendation command from the external device 400 through the communication interface 173 during the mirroring operation or may receive a content recommendation command through the user input interface unit 150.

The communication interface 310 of the content server 300 may receive device identification information and a content recommendation request from the display device 100 (S1001). For example, when the display device 100 performs mirroring with the external device 400, the device identification information may be the device identification information of the external device 400.

The processor 330 of the content server 300 may obtain at least one of content playback information, content setting information, or application installation information stored in association with device identification information received from the content information database 321.

The processor 330 of the content server 300 may generate a recommendation content list including at least one recommendation content based on the obtained content playback information.

The processor 330 of the content server 300 may transmit at least one of the recommendation content list, content setting information, or application installation information to the display device 100 through the communication interface 310.

The processor 170 of the display device 100 may display recommendation content on the display unit 180 based on the recommendation content list received through the communication interface 173. The displayed recommendation content may be mirrored to the external device 400.

In addition, the processor 170 may set the image quality and volume of the mirrored content based on the received content setting information. In addition, when receiving a preferred channel change command from the external device 400, the processor 170 may change to the preferred channel based on the received content setting information and mirror the content provided in the changed channel to the external device 400.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:

a display configured to display first content;

a processor configured to perform a mirroring operation of displaying the first content on an external device; and a communication interface configured to receive device identification information of the external device from the external device, wherein the processor generates first content playback information of the first content and transmits the device identification information of the external device and the first content playback information to a content server through the communication interface, and wherein the processor generates a first content setting information based on image quality information set by a user when the first content is mirrored to the external device, wherein the first content setting information is generated based on a mirroring start time when mirroring to the external device started, a mirroring end time when mirroring to the external device ended, and a total mirroring time during which the first content was mirrored to the external device, wherein the processor transmits the first content setting information to the content server in association with the device identification information of the external device for storage, and wherein when re-mirroring content to a same external device, the processor receives the stored first content setting information from the content server and automatically controls image quality of the re-mirrored content based on the stored first content setting information without requiring user input.

2. The display device of claim 1, wherein the first content playback information comprises at least one of content identification information which is identification information of the first content or content genre information which is genre information of the first content.

3. The display device of claim 2, wherein the first content playback information comprises at least one of content playback start time information which is information on a time when the mirroring started, content playback end time information which is information on a time when the mirroring ended or total content playback time information which is information on a total time when the mirroring was performed.

4. The display device of claim 1, wherein the processor obtains a content change command for changing the first content to second content, changes the first content to the second content in response to the content change command and performs a mirroring operation of displaying the second content on the external device.

5. The display device of claim 4, wherein the processor generates second content playback information or second content setting information of the second content and transmits at least one of the device identification information of the external device, the second content playback information or the second content setting information to the content server.

6. The display device of claim 4, wherein the processor obtains the content change command from the external device through the communication interface.

7. The display device of claim 1, wherein the processor transmits the device identification information of the external device and a content recommendation request to the content server through the communication interface.

8. The display device of claim 7, wherein the processor receives a recommendation content list recommended based on the device identification information of the external device from the content server through the communication interface and displays the recommendation content list to mirror the list to the external device.

9. The display device of claim 1, wherein the processor sets a volume of the first content based on volume setting information included in the content setting information to mirror the first content to the external device.

10. A content recommendation method performed by a display device, the content recommendation method comprising:

displaying first content;

performing a mirroring operation of displaying the first content on an external device;

receiving device identification information of the external device from the external device;

generating first content playback information of the first content; and transmitting the device identification information of the external device and the first content playback information to a content server, and wherein the performing a mirroring operation of displaying the first content on an external device comprises:

generating a first content setting information based on image quality information set by a user when the first content is mirrored to the external device, wherein the first content setting information is generated based on a mirroring start time when mirroring to the external device started, a mirroring end time when mirroring to the external device ended, and a total mirroring time during which the first content was mirrored to the external device, transmitting the first content setting information to the content server in association with the device identification information of the external device for storage, and when re-mirroring content to a same external device, receiving the stored first content setting information from the content server and automatically controlling image quality of the re-mirrored content based on the stored first content setting information without requiring user input.

11. The content recommendation method of claim 10, further comprising:

obtaining a content change command for changing the first content to second content;

changing the first content to the second content in response to the content change command;

performing a mirroring operation of displaying the second content on the external device;

generating second content playback information or second content setting information of the second content; and transmitting at least one of the device identification information of the external device, the second content playback information or the second content setting information to the content server.

12. The content recommendation method of claim 10, further comprising:

transmitting the device identification information and a content recommendation request to the content server;

receiving a recommendation content list recommended based on the device identification information from the content server; and performing a mirroring operation of displaying the recommendation content on the external device.

* * * * *